United States Patent
Chu et al.

(10) Patent No.: US 10,858,290 B2
(45) Date of Patent: Dec. 8, 2020

(54) SYNTHETIC STONE

(71) Applicant: MagneStone Limited, Mongkok, Kowloon (HK)

(72) Inventors: Eddie Wai Ho Chu, New York, NY (US); Shiu Ming Chu, New York, NY (US)

(73) Assignee: MagneStone Limited, Mongkok (HK)

( * ) Notice: Subject to any disclaimer, the term of this patent is extended or adjusted under 35 U.S.C. 154(b) by 126 days.

(21) Appl. No.: 16/043,894

(22) Filed: Jul. 24, 2018

(65) Prior Publication Data

US 2019/0330113 A1  Oct. 31, 2019

(30) Foreign Application Priority Data

Apr. 26, 2018 (CN) ................ 2018 1 0385528

(51) Int. Cl.
| | | |
|---|---|---|
| *C04B 28/10* | (2006.01) | |
| *C04B 40/00* | (2006.01) | |
| *C04B 14/06* | (2006.01) | |
| *C04B 14/36* | (2006.01) | |
| *C04B 14/42* | (2006.01) | |
| *C04B 22/06* | (2006.01) | |
| *C04B 22/14* | (2006.01) | |
| *C04B 24/08* | (2006.01) | |
| *C04B 24/12* | (2006.01) | |

(52) U.S. Cl.
CPC ........ *C04B 28/105* (2013.01); *C04B 40/0067* (2013.01); *C04B 40/0089* (2013.01); *C04B 14/06* (2013.01); *C04B 14/36* (2013.01); *C04B 14/42* (2013.01); *C04B 22/06* (2013.01); *C04B 22/142* (2013.01); *C04B 24/08* (2013.01); *C04B 24/121* (2013.01)

(58) Field of Classification Search
CPC ......... C04B 14/06; C04B 14/36; C04B 14/42; C04B 22/06; C04B 22/142; C04B 24/08; C04B 24/121; C04B 28/105; C04B 40/0067; C04B 40/0089
See application file for complete search history.

(56) References Cited

U.S. PATENT DOCUMENTS

| | | | | |
|---|---|---|---|---|
| 5,733,633 A | * | 3/1998 | Lin ....................... | B32B 5/26 |
| | | | | 428/192 |
| 2018/0155245 A1 | * | 6/2018 | Chu ..................... | C04B 28/105 |

FOREIGN PATENT DOCUMENTS

| | | | | | |
|---|---|---|---|---|---|
| CN | 102399078 A | * | 4/2012 | ............ | C04B 28/30 |
| CN | 105130350 A | * | 12/2015 | | |
| CN | 105367035 A | * | 3/2016 | | |
| CN | 105507524 A | * | 4/2016 | | |
| CN | 105948685 A | * | 9/2016 | | |
| CN | 106007643 A | * | 10/2016 | | |
| CN | 106517796 A | * | 3/2017 | | |
| WO | WO-0185642 A1 | * | 11/2001 | ............ | C04B 28/30 |

\* cited by examiner

*Primary Examiner* — Anthony J Green

(74) *Attorney, Agent, or Firm* — Kaplan Breyer Schwarz, LLP

(57) ABSTRACT

A synthetic stone for decorative purposes, countertops, flooring, and the like comprises, as a major component, magnesium compounds, and includes diamond or quartz sand. It is formed via a vibro-compression process that is conducted under vacuum and at ambient temperature. The synthetic stone slab is very hard, waterproof, mildew-proof, insect-proof, environmentally friendly, and low cost.

12 Claims, 1 Drawing Sheet

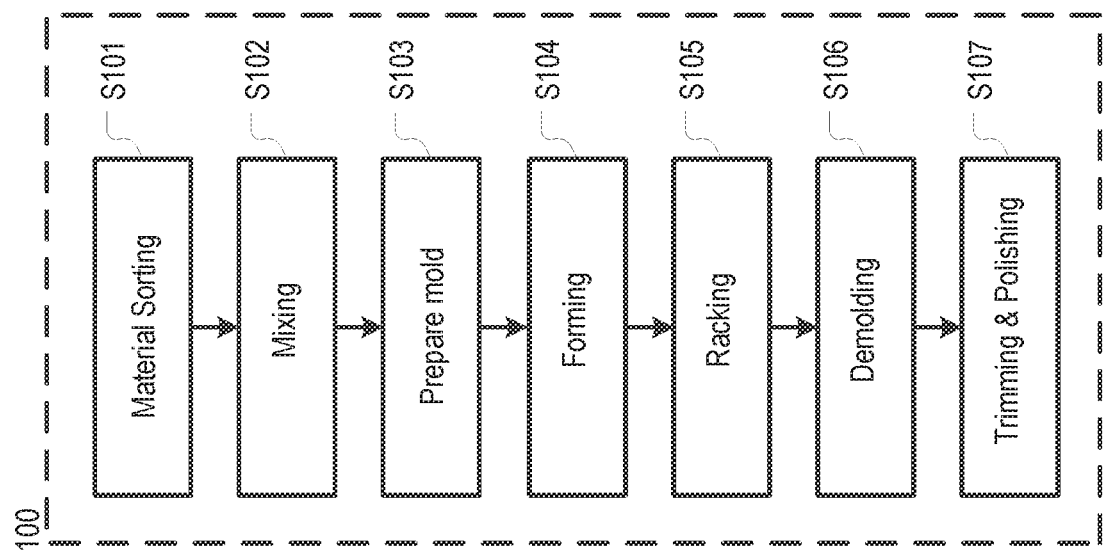

SYNTHETIC STONE

STATEMENT OF RELATED APPLICATIONS

This case claims priority to Chinese Patent Application 201810385528.3, filed Apr. 26, 2018.

FIELD OF THE INVENTION

This invention pertains to synthetic stone.

BACKGROUND OF THE INVENTION

Granite and marble have been used since antiquity as a construction stone. Although still in widespread use, the prices of these materials are expensive, and do have some drawbacks. In particular, as natural materials, they tend to have variations in texture and color, which for some application is undesirable.

Since the 18$^{th}$ Century, synthetic stone has been available for artistic, construction, and industrial uses. Initially, synthetic stones were ceramics or a sand/flint mixture. Over time, these were replaced by masonry products, such as cast stone, which can be made from cements, sands, gravels, and with mineral-coloring pigments.

In the 1970s, engineered stone was developed, which is a composite made of crushed stone and a polymer resin or cement. Engineered stone includes engineered quartz, engineered marble stone, and polymer concrete. Each type is associated with particular applications, based on the stone component thereof. For example, engineered quartz is typically used for kitchen countertops, while engineered marble is most commonly used for flooring and walls. Engineered stone typically refers to composite stone slabs containing more than 85% stone content.

Engineered stone is manufactured by filling a mold with the crushed stone/resin mix, and then heating, vibrating, and compressing the mold under vacuum in a press. The engineered stone is then polished and cut, such as by a water jet cutter or diamond blade saw.

Quartz is much harder than natural stone; whereas the hardness on the Mohs scale of marble is about 3, quartz is twice that. As such, engineered quartz is significantly more scratch resistant than natural stone. It is also less moisture absorbent, more stain resistant, and its texture can be well controlled through the production process. Consequently, engineered quartz now accounts for about 80% of the stone market.

Engineered quartz does have its shortcomings though. Specifically, aspects of the manufacturing process are problematic. It is time consuming and energy intensive. Furthermore, because engineered quartz is made with a significant quantity of various resins and other chemical raw materials, some of the materials and off-gasses from the process are potentially harmful, not to mention foul smelling. In fact, the production of most engineered quartz occurs outside of the U.S.

As such, there is a need for improvements in synthetic stone.

SUMMARY

The invention provides a synthetic stone, a starting formulation therefor, and method for making, that avoids some of the costs and drawbacks of the prior art. The illustrative embodiment of the invention is a magnesium-based synthetic stone slab that can be used, both indoors and outdoors, for decorative purposes, countertops, flooring, and the like. The magnesium-based synthetic stone slab is very hard, waterproof, mildew proof, insect proof, environmentally friendly, and low cost.

Synthetic stone in accordance with the illustrative embodiment is made from a starting composition comprising:
  magnesium oxide: about 40 to about 50 weight percent;
  magnesium sulphate: about 15 to about 25 weight percent;
  diamond or quartz sand: about 8 to about 12 weight percent;
  fiber: about 3 to about 5 weight percent;
  hardening agent: 2 to about 4 weight percent;
  pigments: about 4 to about 6 weight percent;
  chemical additives: about 2 to about 4 percent;
  water: balance of the composition.

In some other embodiments, fiber is not present in the starting mixture (and, of course, the synthesized slab).

During formation of the synthetic stone, reactions occur involving the chemical additives, water, and the starting magnesium compounds, which changes the form of the magnesium compounds in the final synthetic stone.

The process for making the synthetic stone slabs differs from that used for making prior-art engineered stone. In the prior art, heat is required to cure the resins or epoxy that are used in the process. However, compositions in accordance with the invention do not use such ingredients; rather, they use magnesium oxide and a hardening agent, such that heat is not required for fabrication. Consequently, synthetic stone in accordance with the invention is less energy intensive to produce than prior-art engineered stone.

It is notable that the synthetic stone slabs in accordance with the present invention are different from magnesium-based construction board products, such as DRAGON-BOARD®, JETBOARD™, FOREVERBOARD®. The aforementioned construction boards, which are typically used for sheathing, are similar, at least in use and appearance, to sheetrock. These materials typically include magnesium oxide, magnesium chloride, and a large portion of filler material, such as wood fiber, bamboo, and perlite.

BRIEF DESCRIPTION OF THE DRAWING

The FIGURE depicts a block flow diagram of a process for manufacturing synthetic stone slabs in accordance with the illustrative embodiment of the present invention.

DETAILED DESCRIPTION

As used herein, the terms "approximately," "about," "substantially", and similar terms are intended to have a broad meaning consistent with the common and accepted usage by those of ordinary skill in the art to which the subject matter of this disclosure pertains. It will be understood by those of skill in the art that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims. In the absence of any common and accepted usage, the above referenced terms mean "+/−15% of the stated FIGURE".

The FIGURE depicts method 100 for manufacturing the synthetic stone slabs described herein. The process can be automated to a greater or lesser degree, as desired. Although method 100 is similar to that of conventional stone-fabrication methods and uses much of the same equipment, it differs in that in accordance with the illustrative embodiment of the method, heat is not applied during the forming operation.

In operation 101, the ingredients for the synthetic stone slab are selected and weighed to ensure that the starting mixture contains the appropriate amounts of each ingredient. All ingredients are readily commercially available from a variety of suppliers. In some embodiments, the ingredients are fed to hopper and combined.

A synthetic stone slab in accordance with the invention is formulated from the following ingredients, which are present in the starting mixture in the following amounts:
magnesium oxide: about 40 to about 50 weight percent;
magnesium sulfate: about 15 to about 25 weight percent;
diamond or quartz sand: about 8 to about 12 weight percent;
fiber: about 3 to about 5 weight percent;
hardening agent: 2 to about 4 weight percent;
pigments: about 4 to about 6 weight percent;
chemical additives: about 2 to about 4 percent; and
water: balance of the composition.

In some other embodiments, fiber is not present in the starting mixture (and, of course, the synthesized slab). In such embodiments, the weight ranges for all other starting materials are proportionally increased.

Magnesium oxide, MgO, is physically and chemically stable at high temperatures. Magnesium sulfate, $MgSO_4$ $(H_2O)_x$, where $0 \leq x \leq 7$, is an inorganic salt. The diamond or quartz sand provides hardness and scratch resistance to the finished engineered stone. The fiber may be, without limitation, glass woven fabric, which is typically cut into strips (e.g., length in the range of about 20 to about 25 millimeters, etc.). Alternatively, fiber bundles (unwoven bundled strands of fiber) may suitably be used. In some embodiments, carbon fiber is used.

Any of a variety of conventional hardening agents, as typically used for the production of construction board to increase toughness and moisture resistance, may suitable be used in the starting formulation. For example, in some embodiments, the hardening agent is a solvent and isocyanate-free formulation based on cyclocarbonated soybean oil and diamines and functional silica or ZnO fillers.

The pigments are used to provide a desired color to the finished synthetic stone material. For example, in some embodiments, both chromic oxide chloride and ferric chloride are used, such as in a weight ratio (chromic oxide chloride:ferric chloride) in a range of about 1:0.2 to about 1:2. By using these pigments in different ratios, in the range specified, thousands of colors can be created.

Chemical additives (and water) are used to convert at least some portion of the starting magnesium compounds to other magnesium compounds in the synthetic stone slab. The chemical additives include, without limitation, citric acid and calcium carbonate, such as in a weight ratio (citric acid:calcium carbonate) in a range of about 1:0.2 to about 1:2.

Per operation S102, The ingredients are added to a low-speed mixer and thoroughly mixed (i.e., for about 10 to about 60 minutes) at a rate of about 10 to 60 rpm. The mixing step is used in conventional synthetic stone fabrication processes; those skilled in the art will know how to specify an appropriate mixer and use it to mix the ingredients. In some embodiments, only some, not all, of the ingredients are mixed at the same time. In other words, in some embodiments, there are separate mixing steps.

In operation S103, the mixture is poured into a (female) mold of appropriate size and shape for casting the synthetic stone slab. The mold, which can be PVC and typically has a rectangular shape, is filled with an appropriate amount of the starting mixture, as a function of the desired thickness of the final slab. The molds can made to any size, such as 4 ft×8 ft, etc.

In forming operation S104, the mixture is exposed to vibration, compaction force, and vacuum. These operations are performed by a vibro-compaction machine, into which the mold is introduced. The vibro-compaction machine is similar to those used for conventional engineered-stone fabrication processes. A vibro-compaction machine is an apparatus that can simultaneously apply sufficient vibration, pressure, and vacuum to the synthetic stone mixture to force the diamond/quartz sand, fiber, etc., into a tightly packed relationship to ensure that there are substantially no voids in the mixture. In some embodiments, the vibro-compaction machine applies about 100 to about 120 tons of pressure to the mixture in the mold (i.e., about 40-50 psi of mold surface). The operation is performed under vacuum to ensure that no air remains in the mixture, thereby minimizing the porosity of the final product. In some embodiments, the vacuum is about 0.98 kPa. Although the compression, vibration, and vacuum operations are conventional for fabricating engineered stone, in accordance with the present invention and unlike the prior art, the mixture is not heated during forming operation S104.

After forming, the material, while still in the mold, is moved to a storage rack for drying in operation S105. In some embodiments, the mold is dried for 2 to 4 days at room temperature (about 25° C. to as high as about 39° C.).

In operation S106, the hardened material is removed from the mold. In operation S107, the material is trimmed, cut to size, and polished using conventional stone cutting and polishing equipment.

It is to be understood, and will be appreciated by those skilled in the art, that some of the operations of the method can be performed in an order different than implied by the discussion above.

EXAMPLES

Engineered stone in accordance with the present teachings was fabricated via method 100. Compositions of the starting material are weight percent.

|  | Starting Composition | | | |
| --- | --- | --- | --- | --- |
|  | I | II | III | IV* |
| Ingredient |  |  |  |  |
| Magnesium Oxide | 40 | 50 | 45 | 41.2 |
| Magnesium Sulfate | 25 | 15 | 20 | 20.6 |
| Fiber | 3 | 5 | 4 | — |
| Hardening agent[A] | 4 | 2 | 4 | 4.1 |
| Chemical Additives[B] | 2 | 4 | 3 | 4.1 |
| Pigments[C] | 6 | 4 | 5 | 6.2 |
| Diamond/Quartz Sand | 8 | 12 | 10 | 12.4 |
| Water | 12 | 8 | 9 | 11.4 |
| Conditions |  |  |  |  |
| Molding Pressure, psi | 110 | 110 | 110 |  |
| Vacuum level, kPa | 0.98 | 0.98 | 0.98 |  |
| Mixing time, minutes | 60 | 30 | 45 |  |
| Drying time, days | 4 | 2 | 3 |  |
| Hardness, Mohs | 6 | 6 | 6 |  |

*Prophetic example.
[A]For Compositions I, II, and III, the hardening agent comprised cyclocarbonated soybean oil, diamines, and functional silica or ZnO fillers.
[B]For Compositions I, II, and III, the chemical additives were citric acid and calcium carbonate, in a ratio within the weight range of about 1:0.2 to 1:2.
[C]For Compositions I, II, and III, the pigments were chromic oxide chloride and ferric chloride, in a ratio within the weight range of about 1:0.2 to 1:2.

It is to be understood that the disclosure describes a few embodiments and that many variations of the invention can easily be devised by those skilled in the art after reading this disclosure and that the scope of the present invention is to be determined by the following claims.

What is claimed:

1. A composition for forming a synthetic stone slab, wherein the composition, as specified in weight percentages of the total composition, consists essentially of:
an amount of magnesium oxide in a range of about 40 to about 50 percent; an amount of magnesium sulfate in a range of about 15 to about 25 percent; an amount of diamond sand or quartz sand in a range of about 8 to about 12 percent; an amount of fiber in a range of about 3 to about 5 percent; an amount of a hardening agent in a range of about 2 to about 4 weight percent; an amount of pigments in a range of about 4 to about 6 weight percent, wherein the pigments include chromic oxide chloride and ferric chloride; an amount of chemical additives in a range of about 2 to about 4 percent, wherein the chemical additives include citric acid and calcium carbonate; and water for the balance of the composition.

2. The composition of claim 1 wherein the hardening agent is a solvent and isocyanate-free formulation.

3. The composition of claim 1 wherein the chromic oxide chloride and ferric chloride are present in a weight ratio (chromic oxide chloride:ferric chloride) in a range of about 1:0.2 to about 1:2.

4. The composition of claim 1 wherein the citric acid and calcium carbonate are present in a weight ratio of citric acid:calcium carbonate in a range of about 1:0.2 to about 1:2.

5. The composition of claim 2 wherein the solvent and isocyanate-free formulation is based on cyclocarbonated soybean oil, diamines and functional silica.

6. The composition of claim 2 wherein the solvent and isocyanate-free formulation is based on cyclocarbonated soybean oil, diamines and ZnO fillers.

7. The composition of claim 1 wherein the hardening agent is selected from hardening agents suitable for increasing toughness and moisture resistance in construction board production.

8. The composition of claim 1 wherein the fiber comprises glass woven fabric.

9. The composition of claim 1 wherein the fiber comprises unwoven bundled strands of fiber.

10. A composition for forming a synthetic stone slab, wherein the composition, as specified in weight percentages of the total composition, consists essentially of:
an amount of magnesium oxide in a range of about 40 to about 50 percent; an amount of magnesium sulfate in a range of about 15 to about 25 percent; an amount of diamond sand or quartz sand in a range of about 8 to about 12 percent; an amount of fiber in a range of about 3 to about 5 percent; an amount of a hardening agent in a range of about 2 to about 4 weight percent; an amount of pigments in a range of about 4 to about 6 weight percent, wherein the pigments comprise chromic oxide chloride and ferric chloride; an amount of chemical additives in a range of about 2 to about 4 percent, wherein the chemical additives comprise chemical additives suitable for converting at least a portion of at least one of the magnesium oxide or the magnesium sulfate to another magnesium compound; and water for the balance of the composition.

11. A composition for forming a synthetic stone slab, wherein the composition, as specified in weight percentages of the total composition, consists essentially of:
an amount of magnesium oxide in a range of about 40 to about 50 percent; an amount of magnesium sulfate in a range of about 15 to about 25 percent; an amount of diamond sand or quartz sand in a range of about 8 to about 12 percent; an amount of a hardening agent in a range of about 2 to about 4 weight percent; an amount of pigments in a range of about 4 to about 6 weight percent, wherein the pigments comprise chromic oxide chloride and ferric chloride; an amount of chemical additives in a range of about 2 to about 4 percent, wherein the chemical additives comprise chemical additives suitable for converting at least a portion of at least one of the magnesium oxide or the magnesium sulfate to another magnesium compound; and water for the balance of the composition, and wherein the composition excludes fiber.

12. A composition for forming a synthetic stone slab, wherein the composition, as specified in weight percentages of the total composition, consists essentially of:
an amount of magnesium oxide in a range of about 40 to about 50 percent; an amount of magnesium sulfate in a range of about 15 to about 25 percent; an amount of diamond sand or quartz sand in a range of about 8 to about 12 percent; an amount of fiber in a range of about 3 to about 5 percent; an amount of a hardening agent in a range of about 2 to about 4 weight percent; an amount of pigment in a range of about 4 to about 6 weight percent; an amount of chemical additive in a range of about 2 to about 4 percent; and water for the balance of the composition.

* * * * *